US011219112B2

(12) United States Patent
Graff et al.

(10) Patent No.: US 11,219,112 B2
(45) Date of Patent: Jan. 4, 2022

(54) CONNECTED CONTROLS INFRASTRUCTURE

(71) Applicant: APPLETON GRP LLC, Rosemont, IL (US)

(72) Inventors: Timothy E. Graff, Arlington Heights, IL (US); Ravindra Viraj Gurjar, Pune (IN); Yicheng Peter Pan, Leander, TX (US)

(73) Assignee: APPLETON GRP LLC, Rosemont, IL (US)

( * ) Notice: Subject to any disclaimer, the term of this patent is extended or adjusted under 35 U.S.C. 154(b) by 140 days.

(21) Appl. No.: 16/790,041

(22) Filed: Feb. 13, 2020

(65) Prior Publication Data

US 2021/0076470 A1    Mar. 11, 2021

(30) Foreign Application Priority Data

Sep. 9, 2019    (IN) .............................. 201921036251
Oct. 11, 2019   (IN) .............................. 201921041224

(51) Int. Cl.
*H05B 47/155*    (2020.01)
*H05B 47/19*     (2020.01)
(Continued)

(52) U.S. Cl.
CPC ........... *H05B 47/155* (2020.01); *H05B 47/11* (2020.01); *H05B 47/115* (2020.01);
(Continued)

(58) Field of Classification Search
None
See application file for complete search history.

(56) References Cited

U.S. PATENT DOCUMENTS 6,548,967 B1    4/2003 Dowling et al.
6,646,545 B2   11/2003 Bligh
(Continued)

OTHER PUBLICATIONS

U.S. Appl. No. 16/738,898, Event Indications of Hazardous Environment Luminaires Using Visual Sequences, filed Jan. 9, 2020.
(Continued)

*Primary Examiner* — Dedei K Hammond
(74) *Attorney, Agent, or Firm* — Marshal, Gerstein & Borun LLP

(57) ABSTRACT

A luminaire network improves energy efficiency, reduces light pollution, improves the robustness of luminaire control, and reduces maintenance time and costs by implementing intelligent and selective lighting control. For example, the luminaire network may automatically control dimming, light activation, light deactivation, static or dynamic luminaire grouping, and luminaire group control by implementing a hybrid control scheme that accounts for (i) local or global fixed schedules (e.g., based on time of day, worker schedules, etc.), (ii) detected daylight, (iii) detected motion of workers, and (iv) feedback from luminaires in the luminaire network. Further, one or more electronic devices (e.g., mobile devices) may couple to the luminaire network and may facilitate easy monitoring, configuration, and manual control of luminaires in the luminaire network, even when remotely connected to the luminaire network (e.g., via the cloud).

37 Claims, 6 Drawing Sheets

(51) Int. Cl.
*H05B 47/11* (2020.01)
*H05B 47/115* (2020.01)
*H05B 47/165* (2020.01)
*H05B 47/17* (2020.01)

(52) U.S. Cl.
CPC ........... *H05B 47/165* (2020.01); *H05B 47/17* (2020.01); *H05B 47/19* (2020.01)

(56) References Cited

U.S. PATENT DOCUMENTS

| | | |
|---|---|---|
| 7,199,724 B2 | 4/2007 | Danvir et al. |
| 7,309,965 B2 | 12/2007 | Dowling et al. |
| 7,333,903 B2 | 2/2008 | Walters et al. |
| 7,859,398 B2 | 12/2010 | Davidson et al. |
| 7,915,829 B2 | 3/2011 | Keller et al. |
| 8,364,325 B2 | 1/2013 | Huizenga et al. |
| 8,731,689 B2 | 5/2014 | Platner et al. |
| 8,757,847 B2 | 6/2014 | Sett et al. |
| 8,942,564 B2 | 1/2015 | Jovicic et al. |
| 9,049,756 B2 | 6/2015 | Klusmann et al. |
| 9,080,747 B1 | 7/2015 | Hetrick |
| 9,119,169 B2 | 8/2015 | Luo et al. |
| 9,143,230 B2 | 9/2015 | Casaccia et al. |
| 9,215,784 B2 | 12/2015 | Platner et al. |
| 9,247,620 B2 | 1/2016 | Gritti et al. |
| 9,398,588 B2 | 7/2016 | Wang et al. |
| 9,473,248 B2 | 10/2016 | Yang et al. |
| 9,520,939 B2 | 12/2016 | Jovicic et al. |
| 9,612,585 B2 | 4/2017 | Aggarwal et al. |
| 9,622,330 B2 | 4/2017 | Lashina et al. |
| 9,660,727 B2 | 5/2017 | Jovicic et al. |
| 9,679,448 B2 | 6/2017 | Koosha et al. |
| 9,721,442 B2 | 8/2017 | Denteneer et al. |
| 9,735,868 B2 | 8/2017 | Jovicic et al. |
| 9,754,466 B2 | 9/2017 | Simmons |
| 9,813,150 B1 | 11/2017 | Bitra et al. |
| 9,832,826 B2 | 11/2017 | Rodriguez et al. |
| 9,843,386 B2 | 12/2017 | Baggen et al. |
| 9,857,162 B1 | 1/2018 | Gum et al. |
| 9,871,585 B2 | 1/2018 | Rietman et al. |
| 9,930,166 B2 | 3/2018 | Garcia Morchon |
| 9,930,758 B2 | 3/2018 | Jayawardena et al. |
| 9,955,541 B2 | 4/2018 | Dowling et al. |
| 9,955,549 B2 | 4/2018 | Zhang et al. |
| 9,961,747 B2 | 5/2018 | Kumar et al. |
| 9,970,639 B2 | 5/2018 | Yadav et al. |
| 10,009,100 B2 | 6/2018 | Jovicic et al. |
| 10,020,881 B2 | 7/2018 | Jovicic |
| 10,021,770 B2 | 7/2018 | Turvy, Jr. et al. |
| 10,027,409 B2 | 7/2018 | Rietman et al. |
| 10,034,314 B2 | 7/2018 | White et al. |
| 10,064,248 B2 | 8/2018 | Janik et al. |
| 10,068,442 B2 | 9/2018 | Chong et al. |
| 10,117,300 B2 | 10/2018 | Doheny et al. |
| 10,128,948 B2 | 11/2018 | Jovicic |
| 10,135,696 B2 | 11/2018 | Koosha et al. |
| 10,190,759 B2 | 1/2019 | Yadav et al. |
| 10,194,513 B2 | 1/2019 | Jayawardena et al. |
| 10,260,722 B2 | 4/2019 | Treible, Jr. et al. |
| 10,355,781 B2 | 7/2019 | Verma et al. |
| 10,371,345 B2 | 8/2019 | Nolan et al. |
| 10,378,738 B1 | 8/2019 | Davis |
| 10,378,748 B2 | 8/2019 | Ott |
| 10,400,996 B2 | 9/2019 | Holder et al. |
| 10,401,007 B1 | 9/2019 | York et al. |
| 10,408,442 B2 | 9/2019 | Treible, Jr. et al. |
| 10,422,494 B2 | 9/2019 | Moghal et al. |
| 10,510,222 B2 | 12/2019 | Eddins et al. |
| 2014/0052783 A1* | 2/2014 | Swatsky ............... H04W 80/04 709/204 |
| 2019/0159322 A1 | 5/2019 | Jayawardena et al. |
| 2019/0208598 A1 | 7/2019 | Davis et al. |
| 2019/0215935 A1 | 7/2019 | Trublowski et al. |
| 2019/0226666 A1 | 7/2019 | Davis et al. |
| 2019/0234603 A1 | 8/2019 | Treible, Jr. et al. |
| 2019/0257496 A1 | 8/2019 | Pyshos et al. |
| 2019/0257934 A1 | 8/2019 | Riley et al. |
| 2019/0261301 A1 | 8/2019 | Riley et al. |
| 2019/0277482 A1 | 9/2019 | Newton |
| 2019/0285259 A1 | 9/2019 | Tickner et al. |
| 2019/0347916 A1* | 11/2019 | Wild ................... H04L 67/2823 |

OTHER PUBLICATIONS

U.S. Appl. No. 16/786,219, Smart Luminaire Group Control Using Intragroup Communication, filed Feb. 10, 2020.
U.S. Appl. No. 16/793,121, Luminaire as an Intrinsically Safe Power Source, filed Feb. 18, 2020.
U.S. Appl. No. 16/786,213, Smart Dimming & Sensor Failure Detection as Part of Built in Daylight Harvesting Inside the Luminaire, filed Feb. 10, 2020.
IN Application No. 201921035199, Event Indications of Hazardous Environment Luminaires Using Visual Sequences, filed Aug. 31, 2019.
IN Application No. 201921036250, Smart Luminaire Group Control Using Intragroup Communication, filed on Oct. 7, 2019.
IN Application No. 201921037587, Smart Luminaire Group Control Using Intragroup Communication, filed Sep. 18, 2019.
IN Application No. 201921036251, Connected Controls Infrastructure, filed Sep. 9, 2019.
IN Application No. 201921041224, Connected Controls Infrastructure, filed Oct. 11, 2019.
IN Application No. 201921036251, Connected Controls Infrastructure, filed Oct. 19, 2019.
IN Application No. 202021003289, Luminaire as an Intrinsically Safe Power Source, filed Jan. 24, 2020.
IN Application No. 201921037990, Sensor Device Design and Mounting Construction for Connected LED Lighting, filed Sep. 20, 2019.
IN Application No. 201921038344, Sensor Device Design and Mount for Affixing Sensor Device to a Luminaire, filed Sep. 23, 2019.

* cited by examiner

399

| Command | Description |
|---|---|
| 0 | Read Device ID |
| 1 | Read Primary Variable |
| 2 | Read Loop Current and Percentage of Range |
| 3 | Read Dynamic Variables and Loop Current |
| 6 | Write Polling Address |
| 7 | Reed Loop Configuration |
| 8 | Read Dynamic Variable Classifications |
| 9 | Read Device Variables with Status |
| 10 | Read Unique Identifier Associated with Tag |
| 11 | Read Message |
| 12 | Read Tag, Description, Date |
| 13 | Read Primary Variable Transducer Information |
| 14 | Read Device Information |
| 15 | Read Final Assembly Number |
| 16 | Write Message |
| 17 | Write Tag, Descriptor, Date |

FIG. 3B

CONNECTED CONTROLS INFRASTRUCTURE

CROSS-REFERENCE TO RELATED APPLICATIONS

This application claims priority to and the benefit of Indian Application No. 201921036251, filed Sep. 9, 2019 and titled "CONNECTED CONTROLS INFRASTRUCTURE," and Indian Application No. 201921041224, filed Oct. 11, 2019 and titled "CONNECTED CONTROLS INFRASTRUCTURE," the entire disclosures of which are expressly incorporated herein by reference.

TECHNICAL FIELD

The present disclosure generally relates to a connected controls system for controlling a luminaire network in a process control environment and, more particularly, to techniques for managing a hybrid control scheme for the luminaire network including local and central controllers.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

I/O cards (sometimes called "I/O devices" or "I/O modules"), which are also typically located within the plant environment, typically are communicatively disposed between a controller and one or more field devices, enabling communications there between (e.g. by converting electrical signals into digital values and vice versa). Typically, an I/O card functions as an intermediary node between a process controller and one or more field devices configured for the same communication protocol or protocols as those utilized by the I/O card.

As utilized herein, field devices, controllers, and I/O devices may generally be referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as user interface devices (e.g., operator workstations, maintenance interfaces, personal computers or computing devices, handheld devices, etc.), data historians, report generators, centralized databases, or other centralized administrative computing devices that are typically placed in control rooms or other locations away from the harsher field environment of the plant (e.g., in a back-end environment of the process plant).

Regarding user interface devices, the information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

In addition to the devices described above, a typical process control system includes many other supporting devices related to process operation. These additional devices may include power supply equipment, power generation and distribution equipment, rotating equipment such as turbines, chillers, and various other devices. These additional devices may be located at numerous places in a typical plant.

Further, a typical process control plant includes numerous industrial lights throughout the plant to illuminate equipment and working areas. Process control environments can present a number of challenges for lighting systems. For example, process control plants often operate continuously without breaks in production (e.g., 24 hours a day and seven days a week). Consequently, when lights malfunction, the lack of light in a particular area can negatively impact a worker's ability to perform his or her job. For example, a maintenance worker attempting to service a valve may be forced to rely on a portable and potentially inadequate light sources (e.g., flashlights), which may result in more difficult, more time consuming, and more error prone work by the worker. Another potential challenge relates to the difficulty associated with knowing when and where lights should be activated and deactivated. A plant may have workers occupying numerous roles (e.g., operators, maintenance workers, control engineers, managers, etc.), all of whom may have different reasons and times for entering the plant environment and needing illumination. In some cases, a plant may simply choose to leave all of their industrial lights (or a significant number of their industrial light) activated while the plant is operational (e.g., 24 hours a day, seven days a week).

Finally, process control environments may be challenging in that many include hazardous areas. Generally speaking, when used in the context of process control environments, the phrase "hazardous area" refers to an area in which the environment or atmosphere is potentially explosive due to explosive gas or dust. Typically, when an area of a plant is designated as a hazardous area, the plant restricts that area to only allow equipment that is certified as complying with all Intrinsic Safety (IS) standards. Generally speaking, the only al IS standards impose restrictions on electrical equipment and wiring in hazardous environments to ensure that electrical equipment and wiring will not ignite an explosion. To comply with IS standards, engineers generally design electrical equipment with two core concepts in mind: energy limitation and fault tolerance.

The first IS concept dictates that an IS device be designed such that the total amount of energy available in the device be below a threshold sufficient to ignite an explosive atmosphere. The energy can be electrical (e.g., in the form of a spark) or thermal (e.g., in the form of a hot surface). While IS standards can be complex, they generally require that any voltage within a circuit be less than 29 V; that any current within a circuit be under 300 mA; and that the power associated with any circuit or circuit component be under 1.3 W. A circuit having electrical characteristics exceeding these thresholds may pose an explosion risk due to arcing or heat.

The second IS concept dictates that that an IS device be designed in a fault tolerant manner, such that it maintains safe energy levels even after experiencing multiple failures. In short, IS standards reflect a philosophy that circuit faults are inevitable and that energy levels of the circuit must be limited to safe levels when these circuit faults occur.

While IS certified lighting exists, the measures taken to meet IS standards impose numerous constraints on the designs of the lights. For example, it can be difficult to design or modify typical wireless transceivers, which might otherwise be used to create a networked light fixture in a non-hazardous environment, to comply with IS standards. Put simply, typical wireless protocols for wireless LANs (e.g., Wifi) and PANs (e.g., Bluetooth) were not necessarily designed with the goal of being implemented in an intrinsically safe manner.

Note, this background section is intended to provide context that may be helpful for understanding and appreciating the detailed description below. Work of the presently named inventors, to the extent described in this background section, as well as aspects of the background section that may not otherwise qualify as prior art at the time of filing, is neither expressly nor impliedly admitted as prior art against the present disclosure.

SUMMARY

A luminaire network improves energy efficiency, reduces light pollution, improves the robustness of luminaire control, and reduces maintenance time and costs by implementing intelligent and selective lighting control. For example, the luminaire network may automatically control dimming, light activation, light deactivation, static or dynamic luminaire grouping, and luminaire group control by implementing a hybrid control scheme that accounts for (i) local or global fixed schedules (e.g., based on time of day, worker schedules, etc.), (ii) detected daylight, (iii) detected motion of workers, and (iv) feedback from luminaires in the luminaire network. Further, one or more electronic devices (e.g., mobile devices) may couple to the luminaire network and may facilitate easy monitoring, configuration, and manual control of luminaires in the luminaire network, even when remotely connected to the luminaire network (e.g., via the cloud).

In an embodiment, a system or luminaire network for managing hybrid local and non-local control of luminaires in a process control environment comprises any one or more of the following components. The system may include a luminaire configured to implement a first control scheme to generate a first one or more commands to control a light source of the luminaire based on one or more of: (a) a schedule; (b) a first parameter representing a level of ambient light; and (c) a second parameter representing a level of detected motion. The system may include a supervisory controller configured to implement a second control scheme for controlling one or more luminaires (e.g., including the previously mentioned luminaire). The system may include a gateway configured to enable communication between the luminaire and the supervisory controller, wherein the gateway is configured to: (i) couple to the luminaire via a first link conforming to a process control protocol configured to enable field devices in a process control environment to wirelessly communicate by way of command-response communications utilizing a preconfigured set of protocol parameters for the process control protocol; and (ii) couple to the supervisory controller without utilizing the process control protocol. The luminaire may be further configured to: (i) receive, via the first link, a wireless signal carrying a protocol parameter from the preconfigured set of protocol parameters; (ii) analyze a value of the protocol parameter to identify a second command to control the light source of the luminaire, wherein the second command is generated by way of the supervisory controller implementing the second control scheme; and/or (iii) prioritize the second control scheme over the first control scheme by implementing the second command to control the light source, such that the light source is controlled in accordance with the second command regardless of whether a conflict exists between the second command and the first one or more commands generated by way of the luminaire implementing the first control scheme.

In an embodiment, a luminaire comprises any one or more of: (A) a housing; (B) a light source disposed within the housing such that light is projectable from the light source to an area external to the housing; (C) a communication interface disposed in the housing and configured to communicate according to a process control protocol configured to enable field devices in a process control environment to wirelessly communicate by way of command-response communications utilizing a preconfigured set of protocol parameters for the process control protocol; and (D) a luminaire controller. The luminaire controller may be configured to (i) implement a first control scheme to generate a first one or more commands to control the light source based on one or more of: (a) a schedule; (b) a first parameter representing a level of ambient light; and (c) a second parameter representing a level of detected motion. The luminaire controller may be further configured to (ii) receive, via the communication interface, a wireless signal carrying a protocol parameter from the preconfigured set of protocol parameters; (iii) analyze a value of the protocol parameter to identify a second command to control the light source, wherein the second command is generated by way of the supervisory controller implementing the second control scheme; and (iii) prioritize the second control scheme over the first control scheme by implementing the second command to control the light source, such that the light source is controlled in accordance with the second command regardless of whether a conflict exists between the second command and the first one or more commands generated by way of the first control scheme.

In an embodiment, a method may comprise any one or more of the following operations. For example, the method may comprise implementing, by a luminaire, a first control scheme to generate a first one or more commands to control a light source of the luminaire based on one or more of: (a) a schedule; (b) a first parameter representing a level of ambient light; and (c) a second parameter representing a level of detected motion. The method may comprise receiving, at the luminaire, a wireless signal conforming to a process control protocol configured to enable field devices in a process control environment to wirelessly communicate by way of command-response communications utilizing a preconfigured set of protocol parameters for the process control protocol. Further, the method may comprise analyzing the wireless signal to identify a protocol parameter, from the preconfigured set of protocol parameters, carried by the wireless signal. The method may comprise analyzing the protocol parameter to identify a second command to control the light source, the second command generated and transmitted by a supervisory controller implementing a second control scheme. Finally, the method may comprise prioritizing the second control scheme over the first control scheme by implementing the second command to control the light source, such that the light source is controlled in accordance with the second command regardless of whether a conflict exists between the second command and the first one or more commands generated by way of the luminaire implementing the first control scheme.

Finally, in an embodiment, a method may comprise any one or more of the following operations. For example, the method may comprise generating a set of commands for controlling a set of luminaires. Further, the method may comprise encoding the set of commands into a process control message including one or more protocol parameters selected from a preconfigured set of protocol parameters for a process control protocol that is configured to enable field devices in a process control environment to wirelessly communicate by way of command-response communications utilizing the preconfigured set of protocol parameters; wherein the one or more protocol parameters carry the set of commands; wherein the process control message is formatted according to the process control protocol. Additionally, the method may comprise encoding, according to one or more protocols from the Internet protocol suite, the process control message into an Internet protocol suite (IP) message so that the process control message is encapsulated in the IP message. The method may comprise transmitting the IP message to a gateway. The gateway may be configured to perform any one or more of the following operations: (i) receive the IP message; (ii) decode the IP message, according to the one or more protocols from the Internet protocol suite, to identify the process control message; (iii) decode the process control message, according to the process control protocol, to identify (a) the one or more protocol parameters carrying the set of commands; and (ii) corresponding device addresses for each of the one or more protocol parameters; and (v) transmit the one or more protocol parameters to the corresponding device addresses so that the set of luminaires assigned the device addresses (a) receives the one or more protocol parameters, (b) decodes the one or more protocol parameters to identify the set of commands for controlling the set of luminaires, and (c) control the set of luminaires in accordance with the set of commands.

Note, this summary has been provided to introduce a selection of concepts further described below in the detailed description. As explained in the detailed description, certain embodiments may include features and advantages not described in this summary. Further, certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

FIG. 3B shows an example set of preconfigured protocol parameters that may be utilized by disclosed devices to communicate in accordance with an example wireless process control protocol, such as the one discussed with reference to FIG. 3A.

DETAILED DESCRIPTION

Traditionally, lighting systems for process control environments (which often operate 24 hours per day) have had fairly basic functionality. For example, many plants have lighting systems that have been factory configured to operate continuously at a single, particular light intensity.

Here, a connected controls lighting system ("CCLS") or intelligent luminaire network includes a number of features, including intelligent lighting control and mobile user interfaces for accessing and controlling the CCLS. Compared to traditional lighting systems for industrial environments, the CCLS improves energy efficiency, reduces light pollution, improves the robustness of luminaire control, and reduces maintenance time and costs by implementing intelligent and selective lighting control utilizing a hybrid distributed control scheme. Further, the CCLS may implement a three-layer security scheme including: (i) implementing a firewall between a wireless process control network for luminaires (e.g., implemented utilizing a process control protocol such as wirelessHART) and the plant network (e.g., at a gateway between the two networks; (ii) encrypting traffic forwarded from the wireless process control network to the plant network or vice versa; and (iii) implementing a firewall between the plant network and one or more networks "upstream from the plant network (e.g., an enterprise network, the "cloud" or Internet, etc.). Further, the CCLS may include a server or other computing device configured to generate reports or metrics regarding the performance of luminaires, groups of luminaires, an entire network of luminaires, or any combination thereof. The metrics may indicate how the energy consumption of the luminaire(s) compares to typical, always-on industrial lights (e.g., thus enabling users to monitor the energy and money saved when comparing the CCLS to a typical industrial lighting solution).

An Example Process Control Environment

Figure 1:
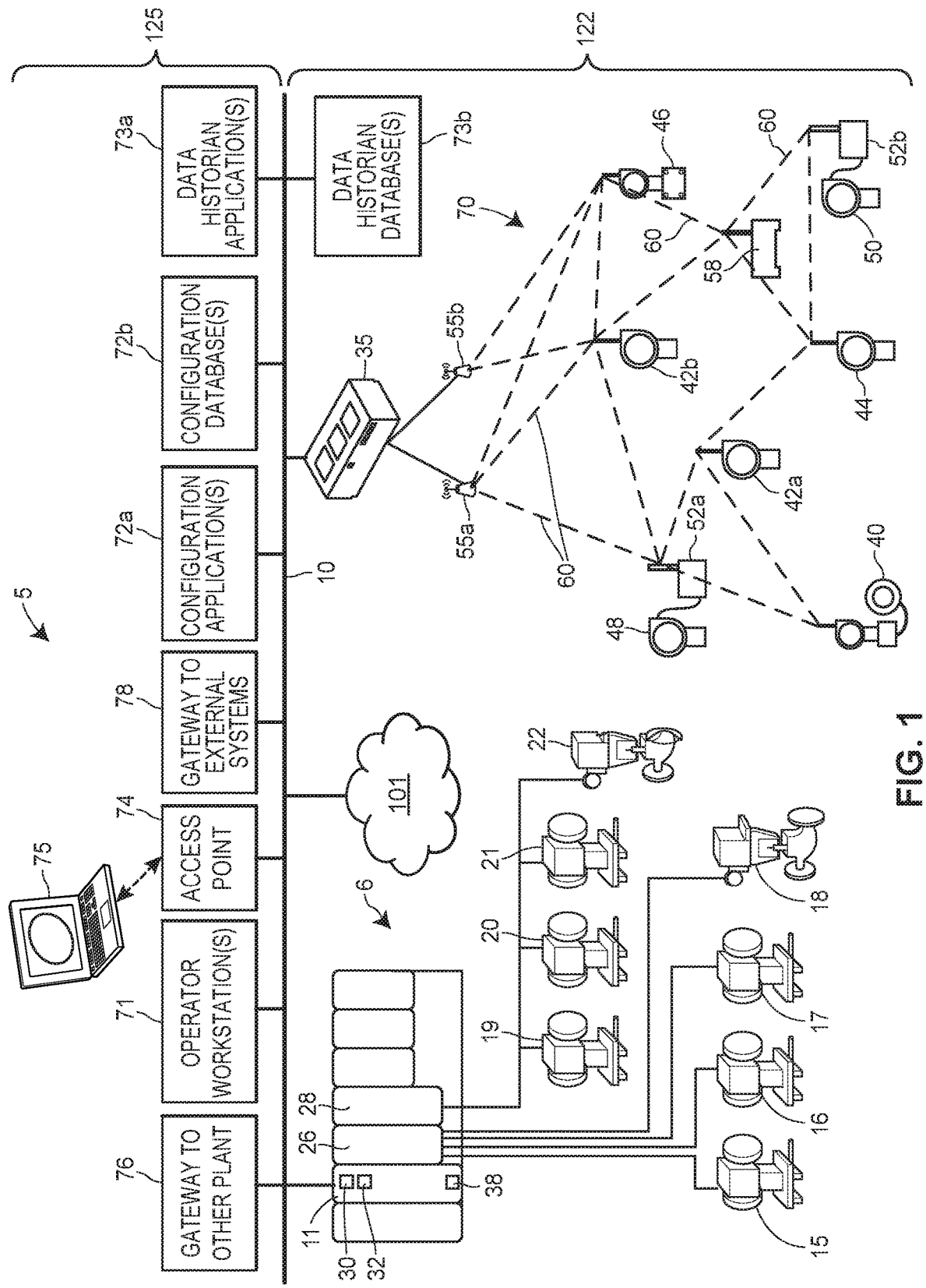
FIG. 1 shows an example process plant, process control system, or process control environment 5 including a CCLS or luminaire network configured to implement a hybrid control scheme in which luminaires are controlled according to both local luminaire controllers and a remote supervisory controller capable of controlling multiple luminaires.

FIG. 1 shows an example process plant, process control system, or process control environment 5 including a CCLS or luminaire network 101 configured to implement a hybrid control scheme in which luminaires are controlled according to both local luminaire controllers and a remote supervisory controller capable of controlling multiple luminaires. Advantageously, the network 101 offers benefits of disturbed control schemes (due to luminaires having their own local controllers that do not necessarily rely on a centralized control scheme) as well as the benefits of centralized control schemes (due to a supervisory controller that may monitor and adjust or override the local controllers). As already noted, compared to typical lighting solutions for industrial environments, the network 101 improves energy efficiency, reduces light pollution, improves the robustness of luminaire control, and reduces maintenance time and costs by implementing intelligent and selective lighting control. For example, the luminaire network 101 may automatically control dimming, light activation, light deactivation, static or dynamic luminaire grouping, and luminaire group control by implementing a hybrid control scheme that accounts for (i) local or global fixed schedules (e.g., based on time of day, worker schedules, etc.), (ii) detected daylight, (iii) detected motion of workers, and (iv) feedback from luminaires in the network 101. Further, one or more electronic devices (e.g., mobile devices) may couple to the luminaire network 101 and may facilitate easy monitoring, configuration, and manual control of luminaires in the network 101, even when remotely connected to the network 101 (e.g., via the cloud).

In any event, the luminaire network 101 may be implemented in the process plant 5, which may include hazardous areas. Accordingly, one or more luminaires or other nodes in the luminaire network 101 may comply with IS standards. The process plant 5 controls a process that may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The process plant or control system 5 of FIG. 1 includes a field environment 122 (e.g., "the process plant floor 122") and a back-end environment 125, each of which is communicatively connected by a process control backbone or data highway 10. The backbone 10 (sometimes referred to as the "link 10," the "network 10," or the "data highway 10") may include one or more wired or wireless communication links, and may be implemented using any desired or suitable communication protocol, such as an Ethernet protocol.

At a high level (and as shown in FIG. 1), the field environment 122 includes physical components (e.g., process control devices, networks, network elements, etc.) that are disposed, installed, and interconnected to operate to control the process during run-time. For example, the field environment 122 includes an I/O network 6 and a wireless I/O network 70. By and large, the components of the I/O network 6 are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

The Field Environment 122 of the Plant 5

As noted, the field environment 122 includes one or more I/O networks such as the I/O network 6, each of which includes: (i) one or more controllers, (ii) one or more field devices communicatively connected to the one or more controllers, and (iii) one or more intermediary nodes (e.g., I/O cards or modules) facilitating communication between the controllers and the field devices. For example, the I/O network 6 includes a controller 11, a set of field devices 15-22, and a pair of I/O cards 26 and 28 facilitating communication between the controller 11 and the set of field devices 15-22.

In a typical plant environment, at least one field device performs a physical function (e.g., opening or closing a valve, increasing or decreasing a temperature, taking a measurement, sensing a condition, etc.) to control the operation of a process implemented in the process plant 5. The field devices may be thought of as a means to manipulate a process input (e.g., a valve position or pump status) or to measure a process output (e.g., a tank level, a flow speed, a pressure, a temperature, a temperature, etc.). Some types of field devices communicate with controllers via I/O cards.

Typically, an I/O card functions as an intermediary node between a process controller (e.g., the controller 11) and one or more field devices (e.g., field devices 15-22) configured for the same communication protocol or protocols as those utilized by the I/O card. Generally speaking, the protocols utilized to facilitate communication between I/O cards or controllers and field devices are process control protocols designed specifically for field devices and process control environments (e.g., the 4-20 mA standard, HART®, WirelessHART®, or FOUNDATION® Fieldbus).

Moreover, field device inputs and outputs are typically configured for either analog or discrete communications. In order to communicate with a field device, a controller generally needs an I/O card configured for the same type of input or output utilized by the field device. That is, for a field device configured to receive analog control output signals (e.g., a 4-20 mA signal), the controller needs an analog output (AO) I/O card to transmit the appropriate analog control output signal; and for a field device configured to transmit measurements or other information via an analog signal, the controller typically needs an analog input (AI) card to receive the transmitted information. Similarly, for a field device configured to receive discrete control output signals, the controller needs a discrete output (DO) I/O card to transmit the appropriate discrete control output signal; and for a field device configured to transmit information via a discrete control input signal, the controller needs a discrete input (DI) I/O card. Further, some I/O cards are configured for resistance temperature detectors (RTD) (which vary the resistance of the a wire with temperature) or thermocouples (TC) (which generate a voltage proportional to a temperature). Generally, each I/O card can connect to multiple field device inputs or outputs, wherein each communication link to a particular input or output is referred to as an "I/O channel" (or, more generically, "channel"). For example, a 120 channel DO I/O card may be communicatively connected to 120 distinct discrete field device inputs via 120 distinct DO I/O channels, enabling the controller to transmit (via the DO I/O card) discrete control output signals to the 120 distinct discrete field device inputs.

In any event, process controllers, field devices, and I/O cards may be configured for wired or wireless communication. Any number and combination of wired and wireless process controllers, field devices, and I/O devices may be included in the process plant environment or system 5.

For example, the field environment 122 includes the I/O network 6, which includes the process controller 11 communicatively connected, via the I/O card 26 and the I/O card 28, to the set of wired field devices 15-22. The field environment 122 also includes a wireless network 70 including a set of wireless field devices 40-46 coupled to the controller 11 (e.g., via a wireless gateway 35 and the network 10). The wireless network 70 may be a part of the I/O network 6. For example, the network 70 may be a wirelessHART network functioning as a subnetwork to the I/O network 6, which may additionally include a wired HART network. If desired, the network 70 or may be an I/O network or a portion of an I/O network not shown in FIG. 1 (and may include controllers or I/O cards not shown in FIG. 1).

In some configurations, the controller 11 may be communicatively connected to the wireless gateway 35 using one or more communications networks other than the backbone 10, such as by using any number of other wired or wireless communication links that support one or more communication protocols (such as the Internet suite protocols, Wi-Fi or other IEEE 802.11 compliant wireless local area network protocol(s), mobile communication protocols (e.g., WiMAX, LTE, or other ITU-R compatible protocol), Bluetooth®, HART®, WirelessHART®, Profibus, HART-IP, FOUNDATION® Fieldbus, etc.)

The Process Controller 11

The controller 11, which may be the DeltaV™ controller sold by Emerson Process Management, may operate to implement a batch process or a continuous process using at least some of the field devices 15-22 and 40-46. In addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 includes a processor 30 that implements or oversees one or more process control routines 38 (e.g., that are stored in a memory 32). A "control routine" (sometimes referred to as a "control module") is a set of instructions, executable by a processor (e.g., of the controller 11), for performing one or more operations to provide or perform on-line control of at least part of a process. Generally speaking, a control routine may be understood as software configured to implement a particular control strategy. Control routines may be saved to memory, e.g., as one or more routines, applications, software modules, or programs. Control routines may reference equipment objects to communicate with field devices corresponding to the equipment objects. A control routine may be made up of function blocks, wherein each function block is a part or a subroutine of an overall control routine. Each control routine may operate in conjunction with other control routines and function blocks to implement control routines or process control loops within the process plant. While the Fieldbus protocol and the DeltaV system protocol use control routines and function blocks designed and implemented in an object oriented programming protocol, control modules could be designed using any desired control programming scheme including, for example, sequential function block, ladder logic, etc., and are not limited to being designed and implemented using the function block or any other particular programming technique (unless otherwise stated).

Returning to the controller 11, the processor 30 is configured to communicate with the field devices 15-22 and 40-46 and with other nodes communicatively connected to the controller 11. Note, any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object-oriented programming, ladder logic, sequential function charts, function block diagrams, or using any other software programming language or design paradigm. The control routines 38 may be stored in any desired type of memory 32, such as random-access memory (RAM), or read only memory (ROM). Likewise, the control routines 38 may be hard-coded into, for example, one or more EPROMs, EEPROMs, application specific integrated circuits (ASICs), or any other hardware or firmware elements. Put simply, the controller 11 may be configured to implement a control strategy or control routine in any desired manner.

Note, the process controlled by the controller 11 (and any other controllers) may be characterized by "process variables." Process inputs, process outputs, controlled variables, manipulated variables, disturbance variables, and setpoints are all example process variables. The "process outputs" may be thought of as process variables representing the existing state of the process, and the "process inputs" may be thought of as process variables representing various conditions, settings, equipment, signals, and other information that may impact execution of the process. The controller 11 may receive as "control inputs" measurements of one or more of the process outputs and may transmit one or more "control outputs" as control signals (which may be thought of as process inputs) configured to manipulate the state of a device to drive a process output to a desired state.

Example "process outputs" might include tank levels, flow rates, material temperatures, piping and tank pressures, the current states of various valves, pumps, and other equipment, etc. Process outputs are often measured and monitored to evaluate performance of the process and to inform how process inputs should be manipulated to manipulate the process outputs to desirable states.

Example "process inputs" might include the state of raw material being processed, environmental conditions, the state of equipment in the plant such as actuators (the manipulation of which may cause process outputs to change), the settings for the equipment (such as the operational settings of valves), etc. The state of any one or more of the process inputs might affect how the process executes. Note, process outputs and process inputs are not necessarily mutually exclusive. For example, a valve CV001 may have a position of 50% open, which may be understood as a current condition of the process and thus a process output. However, the valve position may affect other process outputs (such as flow rate) and may be measured (e.g., to verify that it reaches a desired position after having been commanded to move to the desired position). Thus, the valve position also may be understood as a process input.

As noted, example process variables include controlled variables, manipulated variables, disturbance variables, and setpoints. A "controlled variable" is a process variable (e.g., a tank level) that a controller or control routine is attempting to indirectly control by adjusting a "manipulated variable" (e.g., a water inlet valve for the tank). A control routine may adjust the manipulated variable to drive the controlled variable to a desired setpoint. A "setpoint" represents a desired value for a controlled variable. The setpoint may be automatically set by a controller based on a control routine, or may be manually set by an operator.

Returning to the controller 11, when the processor 30 of the controller executes one or more of the control routines, the controller transmits to a field device a control signal (i.e., a control output) carrying a command or value generated based on: (i) one or more received control inputs (e.g., one or more received signals representing measurements of process outputs obtained by field devices), and (ii) the logic of the one or more control routines being implemented using values of the control inputs as inputs. The control routines may be defined by one or more software elements (e.g., function blocks). Specifically, the controller 11 may implement a control strategy using function blocks, where each function block is an object or other part (e.g., a subroutine) of an overall control routine. The controller 11 may operate in conjunction with function blocks implemented by other devices (e.g., other controllers or field devices) to implement process control loops within the process control system 5.

Note, the term "control loop" generally refers to a subsystem of the process control system utilized to implement control of a particular aspect of the process. A control loop includes the physical components and logical components needed to control a controlled variable (often simply referred to as a process variable or PV). For example, the physical components may include (i) a sensor for measuring the PV (e.g., included in a first field device that measures a tank level), (ii) a final control element (or FCE) that can be adjusted to manipulate the process variable (e.g., a second field device that is a valve), and (iii) a controller configured to adjust the FCE (e.g., the controller 11). The logical components may include the control routine(s) at the controller that drive a control signal to cause an actuator (e.g., a valve actuator) to adjust the FCE (e.g., a valve) based on measurements received at the controller. In the given example, the valve position may be considered the manipulated variable (MV), which may be adjusted to drive the PV to a setpoint. Control loops may be utilized in a variety of scenarios. As one example, a process control system may include a control loop for controlling a water level in a tank. A process control system may include hundreds or thousands of control loops for controlling a plethora of process variables.

Returning to the function blocks that may be implemented at the controller 11, control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The Wired Field Device 15-22 and I/O cards 26 and 28

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. Additionally or alternatively, in some embodiments at least some of the wired field devices 15-22 or at least some of the I/O cards 26, 28 communicate with the controller 11 using the process control data highway 10 or by using other suitable control system protocols (e.g., Profibus, DeviceNet, Foundation Fieldbus, ControlNet, Modbus, HART, etc.).

The Wireless Field Devices 40-46

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, or via the process control data highway 10.

Relationship Between the Front-End 122 and the Luminaire Network 101.

If desired, the controller 11 may be communicatively coupled to one or more of the wireless field devices 40-46 via the luminaire network 101 (e.g., via a luminaire in the network 101). For example, the network 101 and the network 70 may be overlapping or otherwise connected networks such that messages (e.g., commands or measured variables) between the controller 11 and the field device 40 travel via a luminaire in the network 101. In such an example, the controller 11 may transmit a message via a wired link to the network 10 according to a first process control protocol (e.g., 4-20 mA or HART). The message may be routed to a gateway (not shown) connecting the network 101 to the network 10, and the gateway may encode the message in a second message conforming to a wireless process control protocol (e.g., wirelessHART). One or more luminaires in the network 101 may pass the second message to the network 70 (which may conform to the same wireless process control protocol utilized by the network 101, thereby facilitating seamless communication between the networks 70 and 101), where the second message reaches the field device 40, causing the field device 40 to operate accordingly (e.g., actuating a valve). Similar messaging may occur in the opposite direction to facilitate the field device 40 transmitting a measured variable (e.g., pressure, flow rate, tank level, etc.) to the controller 11 via the network 101.

Further, if desired, the controller 11 may be communicatively coupled to the wired field device 48 via the luminaire network 101. Messaging may occur in a manner similar to that previously described. However, when the second message reaches the network 70, it may be routed to the wireless adapter 52a, which may decode the second message to identify the original message conforming to the first process control protocol and to transmit the original message to the field device 48 via a wired link (e.g., utilizing a standard 4-20 mA or a HART 4-20 mA signal).

The Back-End Environment 125 of the Plant 5

As noted, the back-end environment 125 includes various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more operator workstation(s) 71; (ii) a configuration application 72a and a configuration database 72b; (iii) a data historian application 73a and a data historian database 73b; (iv) one or more other wireless access points 74 that communicate with other devices using other wireless protocols; and (v) one or more gateways 76, 78 to systems external to the immediate process control system 5.

Each instance of the back-end components 71, 72a, 72b, 73a, and 73b may be implemented on any suitable computing device or set of computing devices (e.g., a desktop computer or workstation, a laptop, a mobile device such as a phone or tablet, a client/server(s) system, etc.), which may include a user interface with input components (e.g., a mouse, keyboard, touch sensors, hardware buttons, audio sensors for voice input, cameras or motion sensors for gesture input, etc.) and output components (e.g., a display, speakers, etc.).

The workstation 71 enables users (e.g., operators) to view and monitor, via GUIs, run-time operations of the process plant 5, as well as take any diagnostic, corrective, maintenance, or other actions that may be required. At least some of the operator workstations 71 may be located at various, protected areas in or near the plant 5, and in some situations, at least some of the operator workstations 71 may be remotely located, but nonetheless in communicative connection with the plant 5.

The configuration application 72a and the configuration database 72b (collectively the "configuration system 72") may be utilized to configure certain aspects of the plant 5 (e.g., operator interfaces, control routines, etc.). Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

The data historian application 73a collects some or all of the data provided across the data highway 10, and historizes or stores the collected data in the historian database 73b for long term storage.

The one or more other wireless access points 74 enable devices in the back-end environment 125 (and sometimes in the field environment 122) to communicate with other devices using wireless protocols, such as Wi-Fi or other IEEE 802.11 compliant wireless local area network protocols.

Figure 2:
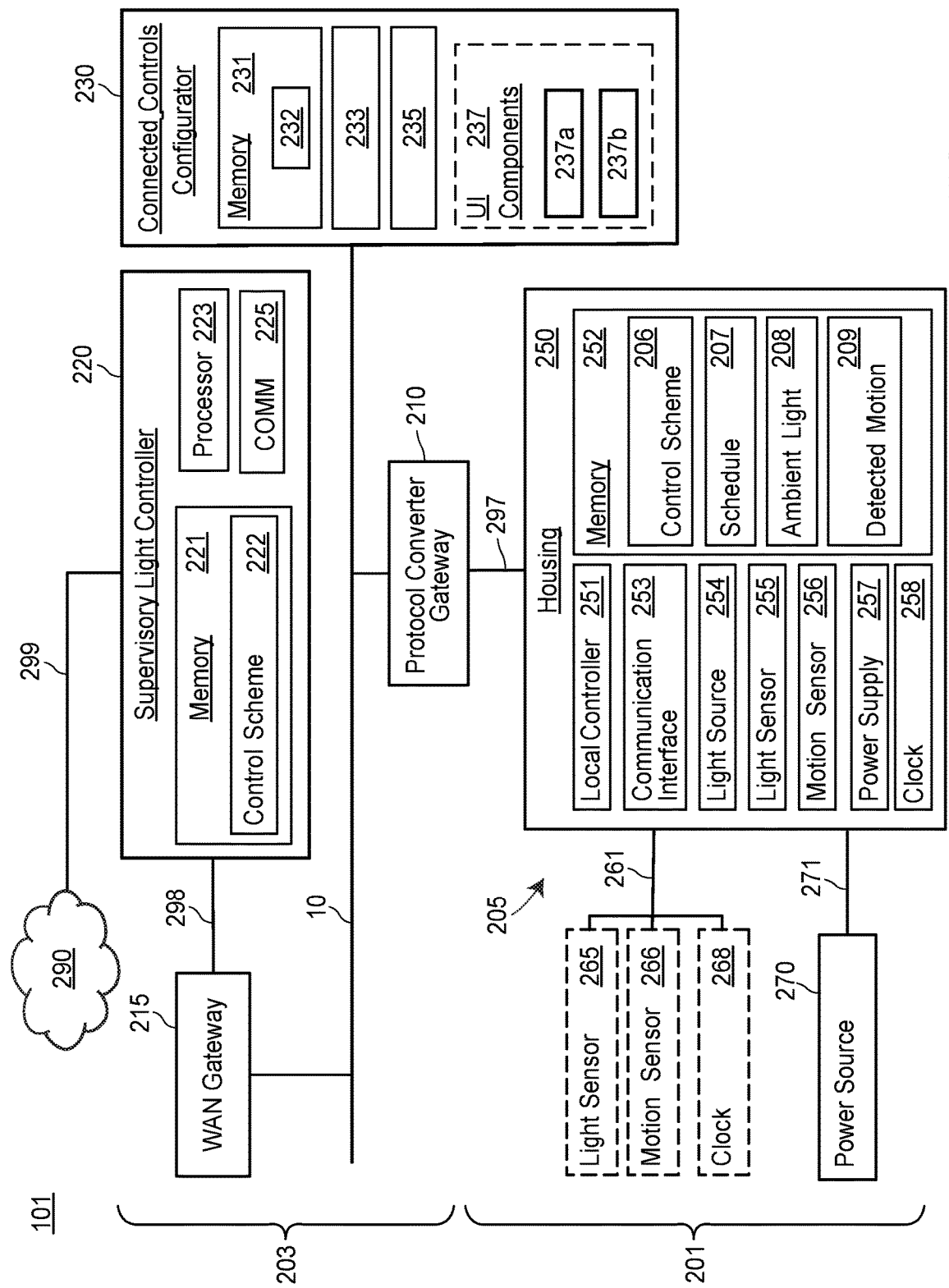
FIG. 2 is a block diagram showing an example of the luminaire network (also shown in FIG. 1) that facilitates hybrid control of luminaires according to control schemes locally implemented by the luminaires and control scheme(s) implemented by supervisory light controller(s).

Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58, nodes of the network 101) also communicate using the wireless protocol supported by the access points 74. As another example, FIG. 2 shows a connected controls configurator that may connected to the network 10 via the access points 74.

If desired, any component of the back-end 125 may be communicatively coupled to any node of the network 101. For example, a user may utilize the workstation 71 to view and monitor, via GUIs, run-time operations of luminaires and other nodes in the network 101 (e.g., to view light status, luminaire health, luminaire configuration, network health, etc.), as well as take any diagnostic, corrective, maintenance, or other actions that may be required. In some embodiments, the workstation 71 and a configurator 230 (shown in FIG. 2) may offer the same or similar functionality regarding the network 101, and may be part of the same application, application suite, or host device. In some embodiments, the workstation 71 is distinct from the configurator 230, and, if desired, the workstation 71 may be configured so that it has little or no interaction with the network 101.

Further, if desired, the data historian 73 may collect some or all of the data reported by any one or more of the luminaires in the network 101, and may historize or store the collected data in the historian database 73*b* for long term storage (e.g., with contextual information such as a timestamp, an ID of the appropriate luminaire, etc.). If desired, the data historian 72 may be configured so that it has little or no interaction with the network 101.

Moreover, if desired, the configuration system 72 may be utilized to configure aspects of the network 101. For example, a user may utilize the configuration system 72 to modify configurations or control schemes implemented by luminaires or controllers in the network 101. In some embodiments, the configuration system 72 and the configurator 230 may offer the same or similar functionality regarding the network 101, and may be part of the same application, application suite, or host device. In some embodiments, the configuration system 72 is distinct from the configurator 230, and, if desired, the configuration system 72 may be configured so that it has little or no interaction with the network 101.

Additional Examples of the Plant 5

Although FIG. 1 only illustrates a single controller 11 with a finite number of (i) field devices 15-22 and 40-46, (ii) wireless gateways 35, (iii) wireless adaptors 52, (iv) access points 55, (v) routers 58, and (vi) wireless process control communications networks 70, FIG. 1 is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

The Luminaire Network 101

FIG. 2 is a block diagram showing an example of the luminaire network 101 (also shown in FIG. 1) that facilitates hybrid control of luminaires according to control schemes locally implemented by the luminaires and control scheme(s) implemented by supervisory light controller(s). Compared to traditional lighting systems for industrial environments, the luminaire network 101 improves energy efficiency, reduces light pollution, and reduces maintenance time and costs by implementing intelligent and selective lighting control utilizing a hybrid control scheme. For example, the luminaire network 101 may control dimming, light activation, light deactivation, and dynamic luminaire grouping by implementing a hybrid control scheme that accounts for (i) local or global fixed schedules (e.g., based on time of day, worker schedules, etc.), (ii) detected light, (iii) detected motion of workers; and (iv) feedback from luminaires in the network 101. The description below identifies the components of the network 101 elaborating on the functionality of the network 101 and its components.

The network 101 includes a subnetwork 201 (or "network 201") and a subnetwork 203 (or "network 203") coupled to each other via a protocol converter gateway 210. The network 201 includes one or more nodes communicating according to a process control protocol and the network 203 includes one or more nodes communicating according to the Internet protocol suite (sometimes referred to as the "TCP/IP protocol"). The description below references FIGS. 3A and 3B to address example protocols for the networks 201 and 203 before returning to FIG. 2 to elaborate on the components of the networks 201 and 203.

An Example Process Control Protocol 300 for the Network 200

Figure 3A:
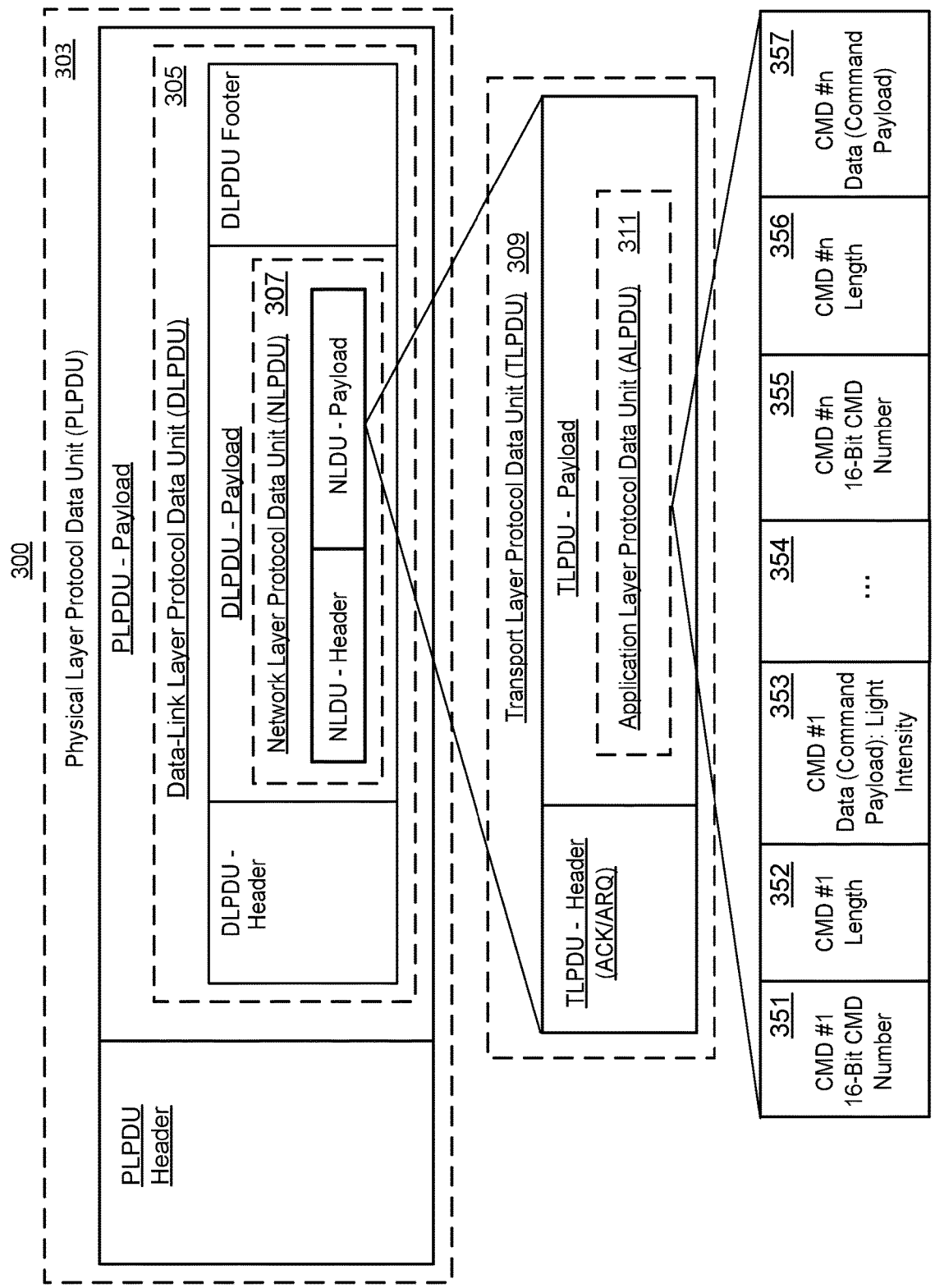
FIG. 3A depicts example layers of an example wireless process control protocol that may be utilized by a process control network, shown in FIGS. 2 and 3, to transmit and receive commands for communicating with and controlling luminaires.

FIGS. 3A and 3B depict example layers of an example wireless process control protocol 300 that may be utilized by the network 201 (shown in FIGS. 1 and 2) to transmit and receive commands for communicating with and controlling luminaires, as well as an example set of preconfigured protocol parameters 399 that may be utilized by disclosed devices to communicate in accordance with an example wireless process control protocol, such as the protocol 300.

The process control protocol 300 includes five layers: a physical layer 303; a data-link layer 305; a network layer 307; a transport layer 309; and an application layer 311. Each layer 303-311 of the protocol 300 may have a set of rules to which messages or PDUs must conform in order for nodes on the network to properly understand the contents of the messages. PDUs at each layer may have a payload as well as metadata (e.g., contained in headers, footers, preambles, etc.). Generally speaking, the payload is the content or data of a PDU and the metadata is the "data about the data" (e.g., regarding formatting, sequencing, timing, destination and source addresses, communication handshakes, etc.).

In an embodiment, the process control protocol 300 may be the wirelessHART protocol. Consistent with current wirelessHART specifications, the protocol 300 may rely on request-response or command-response communications in which a master transmits a request or command and a slave responds. In the network 201, luminaires may be designated as slaves and a protocol converter gateway may be designated as a master (enabling a supervisory controller not on the network 201 to function as a master).

The commands and responses may be handled at the application layer 311. FIG. 3B shows a subset of a preconfigured set of protocol parameters. To illustrate, a device may transmit to a luminaire command 0, which may cause the luminaire to read its device ID and respond accordingly. As another example, a device may transmit to a luminaire command 1, which may cause the luminaire to read and respond with its primary variable (e.g., light intensity).

Returning to FIG. 3A, an application layer PDU may include blocks 351-357. Each command may have three blocks. For example, the first command in the ALPDU includes the block 351 identifying the command number; the block 353 carrying corresponding data for the command (e.g., for a write command), and the block 352 identifying the length of the block 353. Each subsequent command in the ALPDU may have a similar three blocks.

To transmit the message in a format conforming to the protocol 300, each layer adds a header with metadata to create a new PDU until a PLDU is created and ready to be transmitted. For example, the transport layer 309 takes the ALPDU carrying the commands and adds a transport layer header (which may include device status or other information) to the ALPDU to create the TLPDU; then, the network layer 307 adds a network layer header (e.g., including routing information, destination addresses, source addresses, network IDs, etc.) to the TLPDU to create the NLPDU; then, the data-link layer 305 adds a data-link layer header (e.g., adding information that may be used for frequency hopping, channel blacklisting, and security measures) to the NLPDU to create the DLPDU; then, the physical layer 303 adds a physical layer header (e.g., including information to facilitate synchronization and identification of new frames) to the DLPDU to create the PLPDU. The PLPDU may then be transmitted via a suitable wireless channel.

If desired, the physical layer 303 may have any one or more of the following features/standards: 2.4 GHz to 2.5 GHz ISM signal band; O-QPSK modulation (offset quadrature phase-shift keying); 250 kbps data rate; direct-sequence spread-spectrum (DSSS) with frequency-hopping between 15 channels within that band for security and interference reduction; and TDMA (Time-Division Multiple Access) bus arbitration, with 10-millisecond timeslots allocated for device transmission.

Returning to the application layer 311, this layer of the protocol 300 provides a significant benefit. The application layer 311 may be identical to an application layer of a second process control protocol for wired communication such as HART, thereby facilitating seamless integration between the network 201 and a network configured according to the second process control protocol. In such a scenario, the actual content or payload of the messages/commands transmitted via the network 201 according to the protocol 300 would not need to be translated or converted at the application layer. For example, the network 201 may be a wirelessHART network and the second network may be a HART network. In such an example, the ALPDU in a message transmitted from either network can simply be forwarded to the other network.

Note, in an embodiment, the network 300 may conform to a wireless process control protocol other than HART, and may not be limited to the exact layers and structure shown in FIG. 3A.

An Example Protocol Stack 400 for the Network 203

Figure 4:
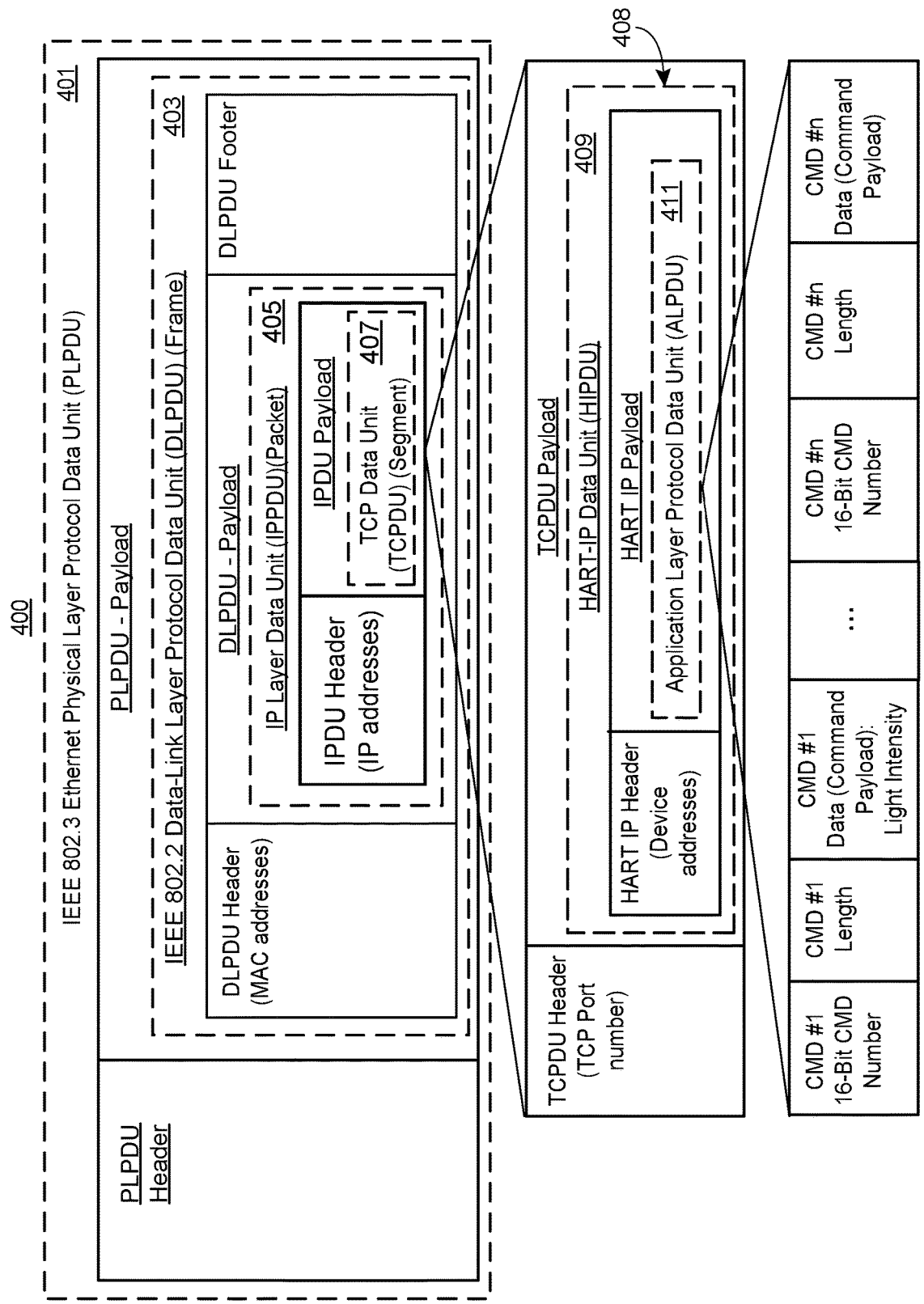
FIG. 4 depicts an example protocol stack including a Hart-IP protocol at a layer that may be utilized to encapsulate, within messages conforming to standard communication protocols selected from the Internet protocol suite, process control messages conforming to process control standards or protocols.

FIG. 4 depicts an example protocol stack 400 including a Hart-IP protocol at a layer 609 that may be utilized to encapsulate process control messages, conforming to process control standards or protocols, within messages IP messages conforming to standard protocols 401-407 selected from the Internet protocol suite.

The stack 400 includes layers 401-407 conforming to protocols from the Internet protocol suite: the IEEE 802.3 Ethernet protocol for the physical layer 401, the IEEE 802.2 protocol for the data-link layer 403, the Internet Protocol (IP) for the IP layer 405, and the Transmission Control Protocol (TCP) for the TCP layer 607.

The stack 400 also includes a protocol 408 (e.g., the HART-IP protocol) for an intermediate layer 409 between the TCP layer 607 and the application layer 611. Note, the protocol or standard for the layer 611 may be identical to that used for the layer 311 shown in FIG. 3A (e.g., HART).

The protocol 408 facilitates simple integration between networks conforming to typical process control protocols (e.g., the network 201) and those not conforming to typical process control protocols (e.g., the network 203). As a result, the protocol 408 enables one to more easily access and interact with process control devices on process control networks.

In short, the protocol 408 encapsulates PDUs from the application layer 611 and adds metadata to create a PDU within the layer 409 that can then be encapsulated and transmitted according to a standard protocol from the Internet protocol suite (e.g., TCP, UDP).

The Networks 201 and 203

Returning to FIG. 2, the network 201 (which may conform to the protocol 300 shown in FIG. 3A) includes the gateway 210 and a luminaire 205 coupled to the gateway 210 via a link or network 297. The luminaire 205 may include one or more components 251-258 housed within a housing 250 and coupled via one or more buses or links (not shown), including: a local controller 251; a memory 252 storing a control scheme 206 that may be implemented by the controller 251 to provide the controller 251 with the functionality described herein, a communication interface 253; a light source 254; a light sensor 255; a motion sensor 256 configured to detect motion; a power supply 257 configured to receive power from an external source and to make the power available to components of the luminaire 250; and a clock 258 that may be utilized to track the current time or date. The memory 252 may store: a one or more parameters 207 representing a predefined scheduled indicating desired light levels or light settings based on the time of day, the date, the day of the week, etc.; a one or more parameters 208 representing a level of ambient light; and a one or more parameters 209 representing detected motion.

If desired, the network 201 may include one or more of: (i) a power source 270 configured to provide power to the luminaire 205 via an electrical connection 271; (ii) a light sensor 265 external to the luminaire 205; (iii) a motion sensor 266 external to the luminaire 205; and (iv) a clock 268 external to the luminaire 205. The sensors 265 and 266 may be similar to the sensors 255 and 256; and the clock 268 may be similar to the clock 258.

Regarding the nodes of the network 203 (which may conform to the one or more protocols from the stack 400 shown in FIG. 4), the network 203 includes the gateway 210 coupling the luminaire 205 to the network 10. The network 203 also includes a WAN gateway 215 that is coupled to the network 10. Further, the network 203 includes a supervisory light controller 220, coupled to the WAN gateway 215 via a link or network 298 (e.g., an enterprise network) and to an external network 290 (e.g., in the "cloud") via a link or network 299, configured to provide a degree of centralized control of the luminaires in the network 201. Additionally, the network 203 includes a connected controls configurator 230, coupled to the network 10, configured to enable a user to remotely monitor, configure, and control the luminaires and control schemes in the network 201.

The Supervisory Light Controller 220

The supervisory light controller 220 may be any suitable stationary or mobile computing device. If desired, the controller 220 may be embodied, in whole or in part, in one or more servers (e.g., servers in the network 10 or the network 298). The controller 220 may communicate "downstream" (e.g., to communicate with any luminaires or other nodes of the network 201 or the network 10). Similarly, the configurator controller 220 may communicate "upstream" with any suitable device, such a device in the network 290 (e.g., to facilitate analyzing performance of nodes in the network 201 and to report various metrics upstream). The controller 220 may include a memory 221 storing a control scheme 222 for controlling luminaires, a processor 223 configured to executed the control scheme 222, and a communication interface 225 capable of transmitting or receiving information via wired or wireless links.

In example operation, the controller 220 functions as a "high level" controller for the luminaires in the network 201 (e.g., the controller 220 may implement group control of the luminaires). As another example, the controller 220 may function as a server that "pushes" data to the cloud 290. The "pushed" data may include alerts originating from the network 201 (e.g., regarding the status of a luminaire), as well as reports related to overall energy efficiency of a particular light, particular group of lights, the network 201 as a whole, or any combination thereof. For example, the controller 220 may analyze energy consumption for a particular luminaire over a period of time (e.g., an hour, a day, a week, a month, a year, etc.) and may generate a metric indicating energy savings relative to a typical continuous-operation luminaire. The same analysis may be performed regarding groups of luminaires or the network 201 as a whole. The controller 220 may transmit the generated metric to one or more devices coupled to the network 290 (e.g., personal or mobile computing devices) or to the configurator 230 so that the receiving device can store or display the metric to a user.

The Configurator 230

The configurator 230 may be any suitable mobile computing device (though it may be stationary in some embodiments). While the configurator 230 is shown being coupled to the network 10 in a layer between the gateway 215 and the gateway 210, if desired, the configurator 230 may be coupled to the network 298 "upstream" from the gateway 215 or may be coupled to the network 209 "upstream" from the controller 220. For example, in an embodiment, the configurator 230 is a mobile device in the cloud 290 and may receive metrics or reports from the controller 220 via the cloud 290. In some embodiments, one or more mobile devices distinct from the configurator 230 may receive (via the cloud 290) metrics or reports from the controller 220 or the configurator 230.

Regarding communications, the configurator 230 may communicate "downstream" (e.g., to communicate with any luminaires or other nodes of the network 201). Similarly, the configurator 230 may communicate "upstream" with any suitable device, such as the controller 220 or a device in the network 290 (e.g., to facilitate analyzing performance of nodes in the network 201 and to report various metrics upstream).

The configurator 230 may include any one or more of: a memory 231 storing a configurator application 232 providing the functionality of the configurator 230, a processor 223 configured to implement the application 232, a communication interface 235 capable of transmitting or receiving information via wired or wireless links, a set of user interface ("UI") components 237 including an input component 237a and an output component 237b. An example output component 237b is a display, which may be any suitable component or device configured to display information in pictorial or visual form (e.g., utilizing LED, LCD, or CRT technology), and may include a screen (which may be touch sensitive in some instances), projector, or any other output device capable of providing visual output. The input component 237a may be any suitable component or sensor that can be actuated or interacted with to provide input to the device 230, and may include a hardware actuator that mechanically actuates to provide input (e.g., a key, a button, etc.) or a sensor that actuates by way of detecting changes in an electromagnetic field (e.g., a capacitive or a resistive touch sensor, which may be integrated with the display 237a to form a touchscreen).

In example operation, the connected controls configurator 230 provides a user interface enabling a user to monitor information about the luminaire network 101 (e.g., to view luminaire light source status, luminaire network status, details regarding local control schemes, details regarding the control scheme 222 of the controller 220, light detection and motion detection parameters such as the parameters 208 and 209, luminaire schedules (e.g., the schedule 207), diagnostic information from the luminaires, etc.). If desired, the configurator 230 may provide analytics or reports regarding performance of the luminaire network 101 (e.g., regarding the overall energy efficiency of the network 101. The configurator 230 may also enable a user to manually control luminaires in the network 101, change controller configurations/control schemes defining behavior of local controllers for the luminaires, and change the control scheme 222 of the controller 220.

Further, in example operation, the configurator 230 may function as a server that "pushes" data to the controller 220 or the cloud 290. The "pushed" data may include alerts originating from the network 201, as well as reports related to overall energy efficiency of the network 201 (like the reports discussed regarding the controller 220). The configurator 230 may transmit generated metrics to one or more devices coupled to the network 290 (e.g., personal or mobile computing devices) or to the controller 220 so that the receiving device can store or display the metric to a user.

The Luminaire 205

Regarding the luminaire 205, the housing 250 may be any suitable housing with an opening (which may be covered via a lens) to enable the light source 254 to project light out of the housing for the purpose of illuminating an area outside the housing 250 (e.g., a portion of a floor in the plant environment). The housing 250 may be constructed of any suitable material (e.g., ceramic, rubber, plastic, metal such as aluminum, steel, copper, brass, etc.) and may have any suitable form factor. For example, the housing 250 may have a surface (e.g., flat), opposite or adjacent to the lens or opening, that is mountable to a wall or ceiling. The housing 250 may be substantially cylindrically shaped, rectangular shaped, disc-shaped, dome-shaped, etc.

The housing 250 may be configured to meet IS standards. For example, the housing may encompass an inner cavity containing the components 251-258, and may form a seal that is "air-tight" (e.g., preventing gases from entering or exiting the housing 250) and/or vapor-proof (e.g., preventing moisture from entering or exiting the housing 250). The housing 250 may be temperature resistant to prevent the housing 250 from heating to unacceptable levels in the event an internal component of the luminaire 205 malfunctions and overheats. Further, the housing 250 may be impact proof.

The controller 251 of the luminaire 205 is an electronic circuit configured to implement a set of instructions (e.g., the control scheme 206 stored to the memory 252). The controller 251 includes one or more processors (not shown) that may be temporarily configured (e.g., by instructions or software such as the routine 206) or permanently configured to perform the relevant operations or functions (e.g., the functions of the routine 206).

The memory 252 is any suitable component including computer-readable media, and may include volatile or non-volatile media. As noted, the memory 252 stores a control scheme or routine 206 that may be implemented by the controller 251. The control scheme 206 may be downloaded to the luminaire 205 via the communication interface 253 from the supervisory light controller 220 or the configurator 230 (e.g., after a user has generated or modified the control scheme to adjust how the luminaire operates).

Regarding the functionality of the control scheme 206, when the controller 251 implements the control scheme 206, the control scheme 206 causes the controller 251 to control the state of the light source 254 (e.g., by generating and transmitting commands to the light source 254) based on any one or more of: (i) the one or more parameters 207 representing a predefined schedule stipulating times of day to activate, deactivate, or adjust the intensity of projected light; (ii) the one or more parameters 208 representing a level of ambient light (e.g., an ambient level of light in an area in or near an area meant to be illuminated by the light source 254; and (iii) one or more parameters 209 representing a level of detected motion (e.g., motion detected in or near the area meant to be illuminated by the light source 254. The parameters 208 and 209 may be set by the sensors 254 and 255 internal to the housing 250 or by the sensors 265-268 external to the housing 250.

Note, the control scheme 206 may be configured ignore or override commands it generates based on the parameters 207-209 with commands that have been generated by the control scheme 222 of the supervisory light controller 220 and transmitted to the luminaire 205.

The communication interface 253 of the luminaire 205 is configured to transmit and receive (e.g., wirelessly) information via a wireless link 297 conforming to the process control protocol utilized by the network 201.

The light source 254 of the luminaire 205 includes LEDs capable of projecting visible light (e.g., white light, colored light, etc.). Depending on the embodiment, the light source 254 may include LED bulbs, halogen bulbs, incandescent bulbs, CFL bulbs, High Intensity Discharge (HID) bulbs, or any combination thereof.

The Protocol Converter Gateway 210

The gateway 210 is a networking device configured to function as a node in both the networks 201 and 203 and to operate as a bridge between the networks 201 and 203. More specifically, the gateway 210 acts as a translator between the networks 201 and 203, which conform to different protocols. For example, the network 201 may conform to a process control protocol configured to enable field devices in a process control environment to wirelessly communicate by way of command-response communications utilizing a pre-configured set of protocol parameters for the process control protocol (e.g., the wirelessHART protocol). By contrast, the network 203 may not conform to the same process control protocol, and may instead conform to a different communication protocol (e.g., one or more protocols from the Internet protocol suite). The protocols of the networks 201 and 203 and the functionality of the gateway 210 are described in more detail below with reference to FIGS. 5 and 6.

The gateway 210 may implement a firewall that monitors or controls traffic between the network 210 and the plant network 10 based on predetermined security rules. Further, the gateway 210 may encrypt traffic, utilizing 128-bit SSL encryption, that is received from the network 210 and forwarded to the network 10. In some embodiments, the gateway 210 may encrypt traffic utilizing 128-bit, 192-bit, or 256-bit AES or SSL encryption.

The WAN Gateway 215

The WAN gateway 215 is a network device connects the network 10 to the network or link 298 (which may include wired or wireless links) and the supervisory light controller 220. The gateway 215 may implement a firewall that monitors or controls traffic between the plant network 10 and the enterprise network 298 based on predetermined security rules.

Example Operation of the Luminaire Network 101

In example operation, the supervisory light controller 220 acts as a centralized or semi-centralized controller for the luminaires in the network 201. The controller 220 is configured to receive information transmitted from the luminaire 205 and other luminaires in the network 201 such as diagnostic information, alarms, sensor data (e.g., detected light or motion), etc. The controller 220 is also configured to transmit commands to the luminaire 205 and other luminaires in the network 201 based on the logic of the control scheme 222 and potentially based on the received information from the luminaires.

The control scheme 222 may group luminaires (e.g., based on physical proximity to one another, based on a division between areas or unit of the plant 5 such as by room, etc.). If desired, the controller 220 may activate an entire group of luminaires when one luminaire in the group activates based on schedule, detected light, or detected motion. As another example, when one luminaire in the group is not achieving a desired light intensity, the controller 220 may increase the intensity of other lights in the group to compensate for the failing luminaire. To that end, the controller 220 may dynamically create, define, and delete groups as needed. For example, when a luminaire fails, the controller 220 may identify the three nearest luminaires to the failed luminaire (e.g., based on data representing locations of luminaires in the network 201, such as GPS coordinates or floor maps) and may create a new group including the three nearest luminaires and the failed luminaires. The controller 220 may then monitor setpoints for the failed luminaire (e.g., desired light intensities as determined by a controller local to the failed luminaire or as determined by the control scheme 222) and may control the other luminaires in the new group (e.g., by transmitting commands via the link 298) to compensate for the failed luminaire.

If desired, the controller 220 may transmit configuration information to the luminaire 205 and any other luminaire in the network 201. For example, the controller 220 may adjust the threshold motion or light that needs to be detected by the sensors 254 and 255 before a responsive action is taken by the local controller 251 (e.g., before the light source 254 is activated or before light intensity is increased). Similarly, the controller 220 may transmit a message to the luminaire 205 to adjust the schedule 207 that the local controller 251 relies on. Similarly, the controller 220 may transmit a message to the luminaire 205 to cause the luminaire to rely on one or more of the sensors 265 and 266 (or one or more sensors of other luminaires in the network 201) instead of or in addition to the sensors 255 and 256. Said another way, the controller 220 may reconfigure luminaires in the network 201 to adjust the degree to which multiple luminaires interact with one another and rely on one another's sensors, statuses, and schedules when implementing their local control schemes. Note, the controller 220 may define this interactive behavior without directly controlling each luminaire. That is, if desired, the controller 220 can define distributed and interactive control schemes between the luminaires without handling all of the control logic and command generation at the controller 220 (thereby removing itself as a single point of failure). It is also worth noting that centralized, top-down control may have benefits in certain circumstances, and the controller 220 can also implement such a centralized scheme if desired. Even in that scenario, however, if the controller 220 somehow loses connection with the network 201, the luminaires in the network 201 can maintain at least a baseline of intelligent lighting control via their local control schemes and whatever configurations were most recently downloaded to their local controllers.

The connected controls configurator 230 is an electronic device configured provide a user interface that enables a user to monitor information about the luminaire network 101 (e.g., to view luminaire light source status, luminaire network status, details regarding local control schemes, details regarding the control scheme 222 of the controller 220, light detection and motion detection parameters such as the parameters 208 and 209, luminaire schedules (e.g., the schedule 207), diagnostic information from the luminaires, etc.). If desired, the configurator 230 may provide analytics or reports regarding performance of the luminaire network 101 (e.g., regarding the overall energy efficiency of the network 101. The configurator 230 may also enable a user to manually control luminaires in the network 101, change controller configurations/control schemes defining behavior of local controllers for the luminaires, and change the control scheme 222 of the controller 220.

The configurator 230 may include a processor 233, a memory 231, and communication interface 235 similar to the components 221, 223, and 225 of the controllers 220. Further, the configurator 230 may include user interface ("UI") components 237 including an input component 237a or an output component 237b.

An example output component 237b is a display, which may be any suitable component or device configured to display information in pictorial or visual form (e.g., utilizing LED, LCD, or CRT technology), and may include a screen (which may be touch sensitive in some instances), projector, or any other output device capable of providing visual output. The input component 237a may be any suitable component or sensor that can be actuated or interacted with to provide input to the device 230, and may include a hardware actuator that mechanically actuates to provide input (e.g., a key, a button, etc.) or a sensor that actuates by way of detecting changes in an electromagnetic field (e.g., a capacitive or a resistive touch sensor, which may be integrated with the display 205f to form a touchscreen).

Note, a number of security features may be provided by the system shown in FIG. 2. For example, a security barrier or layer (e.g., a firewall) may exist between one or more layers of networks or links shown in FIG. 2. For example, a first security barrier may exist between the link 297 and the network 10 (e.g., provided by the gateway 210 or by another device); a second security barrier may exist between the network 10 and the network 298 (e.g., provided by the Gateway 215 or by another device); and a third security barrier may exist between the supervisory controller 220 and a network 290 (e.g., provided by gateway or another device in within the link or network 299). For example, the gateway 210 encrypt traffic forwarded to either the network 10 or the network 297 utilizing AES or SSL encryption (e.g., 128-bit, 192-bit, or 256-bit depending on the embodiment). The gateway 210 and all other nodes on the network 201 (e.g., the luminaire 205) may utilize any one or more of: unique encryption keys for each message sent; data integrity and device authentication; and rotation of encryptions keys used to join the network 201.

Figure 5:
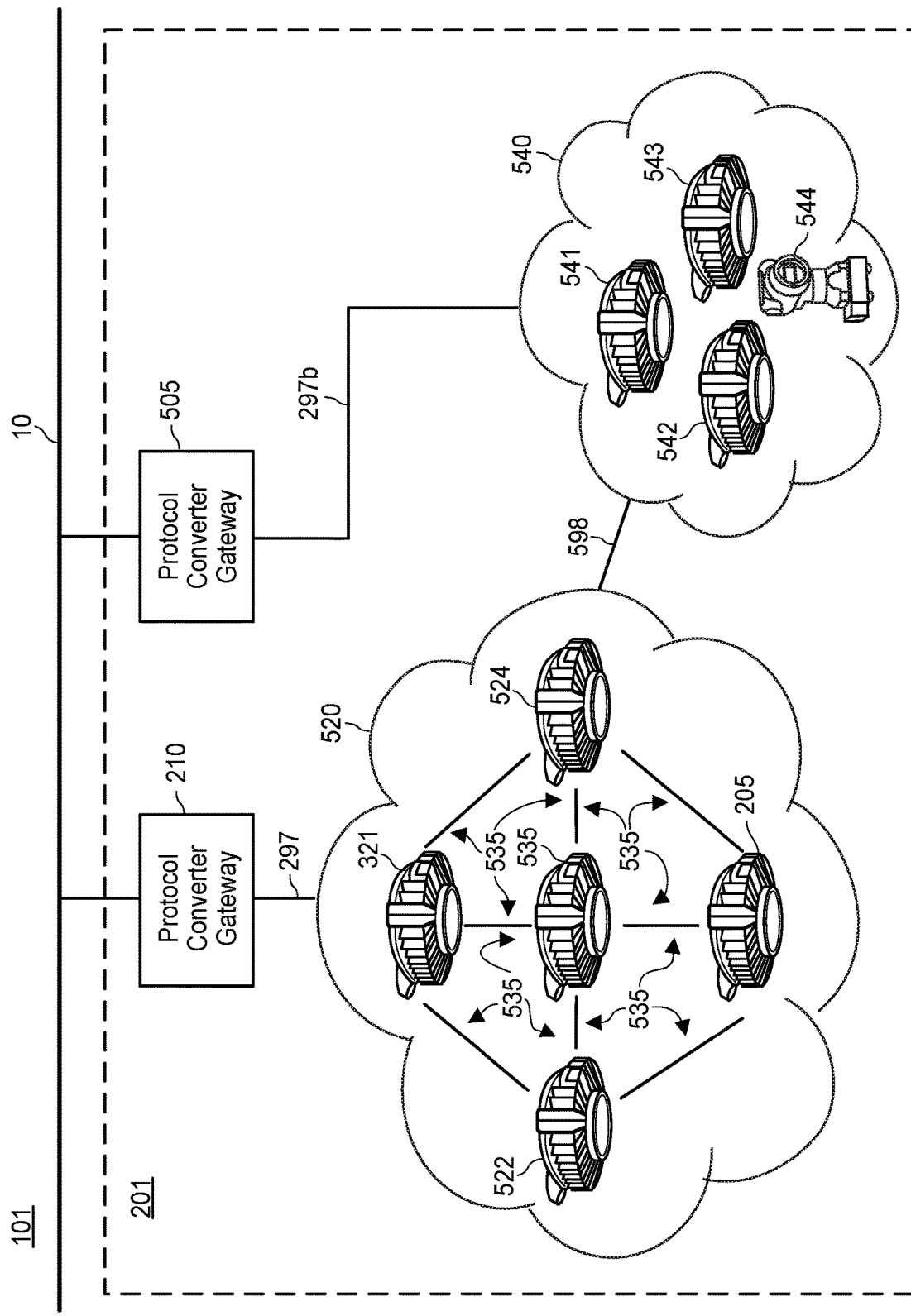
FIG. 5 is a block diagram showing an example of the luminaire network shown in FIGS. 1 and 2 in which a process control network includes multiple sets of luminaires.

FIG. 5 is a block diagram showing an example of the luminaire network 101 in which the network 201 includes multiple sets 520 and 540 of luminaires. The network 201 may have a mesh topology, a star topology, or a hybrid topology utilizing both mesh and star topologies.

The set of nodes 520 is coupled to the network 10 via the link 297 and the gateway 210 (both shown in FIG. 2). The set 520 includes the luminaire 205 (also shown in FIG. 2) as well as luminaires 521-524, which are communicatively interconnected via a set of links 535. Note, the links 535 may be similar to the link 297 previously described and may conform to the same process control protocol.

The set of nodes 540 is coupled to the network 10 via a link 598 (similar to the links 535) or a link 297b (similar to the previously described link 297) coupled to a protocol converter gateway 355 (similar to the gateway 210). The set 540 includes nodes 541-544, which includes luminaires 541-543 and a field device 544. Advantageously, because the network 201 its constituent nodes and links conform to a process control protocol, a field device similarly configured to wireless communication in accordance with the process control protocol can communicate via the luminaires in the network 201 (e.g., to transmit a message to or receive a message from the controller 11 shown in FIG. 1 via the luminaires in the network 201). In some embodiments, the network 201 does not include the field device 544. Further, in some embodiments, the network 201 does not include the link 598.

The network 201 may include additional clusters or groups of luminaires or other nodes similar to the sets 520 and 540, any one of which may establish connectivity to the network 201 by way of establishing a link to either of the gateways 210 and 305 or to any of the nodes in the sets 520-540.

Additional Considerations

Descriptions of various aspects, apparatuses, systems, components, devices, methods, and techniques for managing discrete process control elements (e.g., discrete devices, discrete communication channels, discrete signals, etc.) and for smart commissioning discrete elements in the control system 5 follow.

Additionally, when implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Each of the described techniques may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

General Terms and Phrases

Throughout this specification, some of the following terms and phrases are used.

Access Point. Generally speaking, an "access point" is a device that converts wired traffic (e.g., packets) to wireless traffic and vice versa. It may be thought of as a gateway between a wired network or sub-network and wireless network or sub-network.

Application. See "Routine."

Bus. Generally speaking, a bus is a communication system that transfers information between components insider a computer system, or between computer systems. a processor or a particular system or subsystem may communicate with other components of the system or subsystem via one or more communication links. When communicating with components in a shared housing, for example, the processor may be communicatively connected to components by a system bus. Unless stated otherwise, as used herein the phrase "system bus" and the term "bus" refer to: a data bus (for carrying data), an address bus (for determining where the data should be sent), a control bus (for determining the operation to execute), or some combination thereof. Depending on the context, "system bus" or "bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Communication Interface. Some of the described devices or systems include a "communication interface" (sometimes referred to as a "network interface"). Each of the described communication interfaces (e.g., 225, 253, 235) may enable the system of which it is a party to (i) send information or data to other systems or components or (ii) receive information or data from other systems or components. A communication interface configured to enable a system to couple to a peripheral device (e.g., a keyboard, a monitor, an external hard drive, etc.) may be referred to as a "peripheral interface" or "I/O interface" (see "I/O interface"). In some instances, one or more of the describes communication interfaces may be utilized to establish a direct connection to another system. In some instances, one or more of the described communication interfaces enable the system(s) of which they are a part to connect via a link to a network (e.g., a personal area network (PAN), a local area network (LAN), or a wide area network (WAN)).

If desired, the described communication interfaces may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. Further, in some instances a described communication interface may refer to multiple interfaces for communicating with components or systems external to a system. For example, in some instances, a described communication interface may refer to a set of communication interfaces including: one or more wired communication interfaces, one or more wireless communication interfaces, and one or more I/O or peripheral interfaces. The described communication interfaces and systems may conform to any one or more suitable communications protocols, standards, or technologies, such as those described herein Communication Protocols. In this description, communication protocols, standards, and technologies may be referred to generically as "communication protocols." Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNIP"), secure shell protocol ("SSH"), and any other communications protocol or standard, or any combination thereof. Regarding TCP/IP (sometimes more generally "the Internet protocol suite"), IP addresses may be utilized for messaging by various components. Generally speaking, the term "Internet protocol suite" refers to transport, internet, and/or link layer protocols, including: TCP, UDP, DCCP, SCTP, RSVP, RDP, RDS, RUDP, PPTP, IP (e.g., IPv4, IPv6), ICMP, ICMPv6, ECN, IGMP, IPsec, etc.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

In some instances, a wireless electromagnetic signal may be a light signal oscillating at a frequency of roughly 300 GHz to 30 PHz with wavelengths of roughly 100 nm to 1 mm, which may be: (i) an ultraviolet light ("UV") signal having a wavelength roughly in the range of 10 nm-400 nm and a frequency roughly in the range of 750 THz-30 PHz; (ii) a visible light signal having a wavelength roughly in the range of 400 nm-700 nm and a frequency roughly in the range of 430 THz-750 THz, or (iii) an infrared ("IR") signal having a wavelength roughly in the range of 700 nm-1 mm and a frequency roughly in the range of 300 GHz-430 THz. Unless otherwise stated, described light signals may conform to any suitable light signal protocol or standard, such as visible light communication (VLC) standards, light fidelity (Li-Fi) standards, Infrared Data Association (IrDA) standards, IrSimple standards, etc.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" my refer to multiple databases, each of which may be linked to one another.

Display Device. Generally speaking, the terms "display device" or "display" refer to an electronic visual display device that provides visual output in the form of images, text, or video. Typically, a display device may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Gateway. A (control) gateway is a network node that acts as an entrance to another network. In homes, the gateway can be the ISP (internet service provider) that connects the user to the internet and/or a dedicated network service provider. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the user's premises that serves as a bridge between local devices and applications and remote cloud-based storage and hosted applications and services and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, de-duplication, WAN optimization for faster performance, snapshots, version control, and data protection.

Graphic User Interface (GUI). See "User Interface."

Input/Output (I/O) Interface. Generally speaking, an I/O interface of a computer system is a hardware component (e.g., an I/O controller installed on a motherboard) that communicatively connects one or more processors of the computer system to one or more input or output devices such as UI device or peripheral devices. The I/O interface may receive input and output requests from a system processor, and may then send device-specific control signals to controlled devices based on the requests. The I/O interface may also receive data, requests, or commands from connected devices that are then transmitted to system processors. I/O interfaces are sometimes called device controllers. The software on a system that interacts with a device controller and that enables the device controller to control or otherwise communicate with a particular device is generally referred to as a "device driver."

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol and/or payload (e.g., identifying the protocol for the message, the intended recipient node, the originating node, the size of the message and/or payload, data integrity information for checking the integrity of the message, etc.). In some instances, a packet or sequence of packets may be thought of as a message.

Module. When used in the context of a software system, the term "module" generally refers to a set of applications, routines, or executable instructions. See "Routine." In some instances, the term "module" refers to a component of a physical system (e.g., a car includes a number of modules, such as an engine, transmission, brakes, etc.). The context of the use of the term will make clear whether the "module" refers to a software component or non-software component.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers, switches, or hubs responsible for forwarding directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Object. Generally speaking, the term "object," when used in the context of a software system, refers to a variable, a data structure, a function, a method, an instance of a class or template, or some combination thereof. An object is typically referenceable by a unique or relatively unique identifier.

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource. The call may be (i) a "function call" that is invoked to cause execution of a resource (e.g., set of instructions) stored at a library accessible by the software program; (ii) a "system call" that is invoked to cause execution of a system resource (e.g., often running in privileged kernel space and only executable only by the operating system); (iii) a "remote call" that is invoked to cause a logical or physical entity with a different address space to execute a resource; or (iv) some combination thereof. As an example, a routine executed by a processor of a device may invoke a "remote call" to cause execution of a resource at (i) a second device (e.g., a server host, an end-user device, a networking device, a peripheral device in communication with the device, or some other physical device); (ii) a virtual-machine on the same or different device; (iii) a processor (e.g., CPU or GPU) that is different from the original processor and that may be internal or external to the device executing the routine; or (iv) some combination thereof.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Router. Generally speaking, a "router" is a device that forwards data packets along networks and is connected to at least two networks, commonly two LANs, WANs, or a LAN and its ISP's network. Routers may be located at a "gateway" where two or more networks connect. Typically, routers use headers and forwarding tables to determine paths for forwarding packets and use protocols to communicate with each other to configure a route between hosts. This is in contrast to a network switch, which typically forwards traffic to a next node without necessarily knowing the final destination of the traffic or the path of the traffic to the final destination.

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

Switch. Generally speaking, a "network switch" or "switch" is a device that forwards traffic (e.g., packets) in a network. Generally speaking, a switch stores a table associating each port with one or more end-node addresses. When it receives traffic directed to an end-node, it performs a look-up on the table to determine to which port the traffic should be forwarded. When the table doesn't not link an end-node address to any particular port, it performs a discovery operation by broadcasting a message to all of its ports directed to the end-node and waits for a response from the end-node. When the response is received, it updates the table to associate the new end-node address with the responsive port. Generally speaking, the switch does not store data pertaining to intermediary nodes between the switch and the end-node. (look at Emerson App).

User Interface (UI). Generally speaking, a user interface refers to the components of a computer system by which a user and the computer system interact. The UI components may be hardware, software, or some combination thereof, and may include UI input components, UI output components, or some combination thereof.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems provide a graphical user interface (GUI) by way of a UI output component such as an electronic display. Generally speaking, a GUI is generated via a routine and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

Generally speaking, a window is an area on the screen that displays information, with its contents being displayed independently from the rest of the screen. Generally, a menu is a list of selectable choices that a user may select to execute a corresponding command (e.g., to cause the menu to expand and display additional choices, to cause a new window to be generated, etc.). Generally, an icon is small image representing an object such as a file, an application, a web page, or a command. A user can typically interact with an icon (e.g., by single or double pressing or clicking) to execute a command, open a document, or run an application.

What is claimed is:

1. A system for managing hybrid local and non-local control of luminaires in a process control environment, the system comprising:
   a luminaire configured to implement a first control scheme to generate a first one or more commands to control a light source of the luminaire based on one or more of: (a) a schedule; (b) a first parameter representing a level of ambient light; and (c) a second parameter representing a level of detected motion;
   a supervisory controller configured to implement a second control scheme for controlling one or more luminaires;
   a gateway configured to enable communication between the luminaire and the supervisory controller, wherein the gateway is configured to: (i) couple to the luminaire via a first link conforming to a process control protocol configured to enable field devices in a process control environment to wirelessly communicate by way of command-response communications utilizing a preconfigured set of protocol parameters for the process control protocol; and (ii) couple to the supervisory controller without utilizing the process control protocol;
   wherein the luminaire is further configured to:
      (i) receive, via the first link, a wireless signal carrying a protocol parameter from the preconfigured set of protocol parameters;
      (ii) analyze a value of the protocol parameter to identify a second command to control the light source of the luminaire, wherein the second command is generated by way of the supervisory controller implementing the second control scheme; and
      (iii) prioritize the second control scheme over the first control scheme by implementing the second command to control the light source, such that the light source is controlled in accordance with the second command regardless of whether a conflict exists between the second command and the first one or more commands generated by way of the luminaire implementing the first control scheme.

2. The system of claim 1, wherein the luminaire is a first luminaire, and wherein the one or more luminaires includes: (i) the first luminaire and (ii) a second luminaire coupled to one or more of the first luminaire and the supervisory controller.

3. The system of claim 2, wherein the process control protocol is a first process control protocol; and wherein the second luminaire is coupled to the first luminaire via a wired link utilizing a second process control protocol distinct from the first process control protocol.

4. The system of claim 3, wherein second luminaire is configured to receive, via the first luminaire, a hybrid signal including an analog 4-20 mA signal and a digital signal superimposed on the analog 4-20 mA signal.

5. The system of claim 3, wherein the first process control protocol is WirelessHART; wherein the second process control protocol is HART; and wherein the supervisory controller is coupled to the gateway via a second link conforming to a protocol from the Internet protocol suite.

6. The system of claim 5, wherein the second link also conforms to the message queuing telemetry transport (MQTT) protocol.

7. The system of claim 1, wherein the first parameter indicates the level of ambient light within an area that the luminaire is configured to illuminate via the light source.

8. The system of claim 1, wherein the first parameter indicates the level of ambient light within a first area outside a second area that the luminaire is configured to light.

9. The system of claim 7, wherein the first parameter is set according to a light sensor external to the housing.

10. The system of claim 8, wherein the luminaire is a first luminaire, and wherein the light sensor is included in a second luminaire coupled to one or more of the supervisory controller and the first luminaire.

11. The system of claim 1, wherein the second parameter is a binary parameter configured to hold a first value representing a first level of detected motion or a second value representing a second level of detected motion.

12. The system of claim 1, wherein the second parameter is configured to hold three or more values representing three or more levels of detected motion.

13. The system of claim 1, further including a process controller coupled to the luminaire and a field device coupled to the luminaire, wherein the process controller is configured to transmit to the field device or receive from the field device, via the luminaire, parameters representing: (i) commands to control the field device or (ii) measurements obtained by the field device.

14. The system of claim 1, wherein the supervisory controller is coupled to the gateway via a second link conforming to the HART-IP protocol.

15. The system of claim 1, further including a mobile control device configured to retrieve one or more parameters regarding the luminaire from one or more of: the luminaire, the gateway, and the supervisory controller.

16. A luminaire comprising:
(A) a housing;
(B) a light source disposed within the housing such that light is projectable from the light source to an area external to the housing;
(C) a communication interface disposed in the housing and configured to communicate according to a process control protocol configured to enable field devices in a process control environment to wirelessly communicate by way of command-response communications utilizing a preconfigured set of protocol parameters for the process control protocol;
(D) a luminaire controller configured to:
(i) implement a first control scheme to generate a first one or more commands to control the light source based on one or more of: (a) a schedule; (b) a first parameter representing a level of ambient light; and (c) a second parameter representing a level of detected motion;
(ii) receive, via the communication interface, a wireless signal carrying a protocol parameter from the preconfigured set of protocol parameters;
(iii) analyze a value of the protocol parameter to identify a second command to control the light source, wherein the second command is generated by way of the supervisory controller implementing the second control scheme; and
(iii) prioritize the second control scheme over the first control scheme by implementing the second command to control the light source, such that the light source is controlled in accordance with the second command regardless of whether a conflict exists between the second command and the first one or more commands generated by way of the first control scheme.

17. The luminaire of claim 16 wherein the luminaire controller is further configured to utilize timestamps, received via wireless signals conforming to the process control protocol, to identify a current time; wherein the first control scheme includes an analysis comparing the schedule to the current time.

18. The luminaire of claim 16, wherein the luminaire controller is further configured to:
receive, via the communication interface, a second wireless signal carrying a second value of the protocol parameter;
analyze the second value of the protocol parameter to identify a third command to control the light source, wherein the third command is generated by way of a second luminaire implementing a third control scheme;
implement the third command when it does not conflict with the second command; and
ignore the third command when it conflicts with the second command.

19. The luminaire of claim 16, further including one or more sensors for detecting one or more of ambient light and motion; wherein one or more of the first and second parameters are set according to the one or more sensors.

20. The luminaire of claim 16, wherein one or more of the first and second parameters are set according to one or more dedicated sensors external to the housing.

21. The luminaire of claim 16, wherein one or more of the first and second parameters are set according to one or more sensors internal to a housing of a second luminaire.

22. The luminaire of claim 16, wherein the housing is configured for intrinsically safe operation in a hazardous environment.

23. The luminaire of claim 16, wherein the first parameter is configured to hold three or more values representing three or more levels of ambient light detected in the area and wherein the first control scheme is configured to increase or decrease an intensity of light projected in the area to drive the value of the first parameter to a desired level of ambient light.

24. The luminaire of claim 16, wherein the luminaire controller is further configured to transmit information to the supervisory controller by transmitting, via the communication interface, a wireless signal carrying a one or more protocol parameters from the preconfigured set of protocol parameters.

25. A method comprising:
implementing, by a luminaire, a first control scheme to generate a first one or more commands to control a light source of the luminaire based on one or more of: (a) a schedule; (b) a first parameter representing a level of ambient light; and (c) a second parameter representing a level of detected motion;
receiving, at the luminaire, a wireless signal conforming to a process control protocol configured to enable field devices in a process control environment to wirelessly communicate by way of command-response communications utilizing a preconfigured set of protocol parameters for the process control protocol;
analyzing the wireless signal to identify a protocol parameter, from the preconfigured set of protocol parameters, carried by the wireless signal;
analyzing the protocol parameter to identify a second command to control the light source, the second command generated and transmitted by a supervisory controller implementing a second control scheme;
prioritizing the second control scheme over the first control scheme by implementing the second command to control the light source, such that the light source is controlled in accordance with the second command regardless of whether a conflict exists between the second command and the first one or more commands generated by way of the luminaire implementing the first control scheme.

26. The method of claim 25, wherein each of the first and second protocol parameters relates to a light intensity.

27. The method of claim 25, further including:
detecting, via a light sensor of the luminaire, the level of ambient light; and
setting the first parameter according to the detected level of ambient light.

28. The method of claim 25, further include:
detecting, via a light sensor external to the luminaire, the level of ambient light; and
setting the first parameter according to the detected level of ambient light.

29. The method of claim 25, further including:
detecting, via a motion sensor of the luminaire, the level of detected motion; and
setting the second parameter according to the detected level of motion.

30. The method of claim 25, further including:
detecting, via a motion sensor external to the luminaire, the level of detected motion;
setting the second parameter according to the detected level of motion.

31. The method of claim 25, wherein the wireless signal is received from a gateway, wherein the method further includes:
receiving from a supervisory controller, at a gateway communicatively disposed between the luminaire and the supervisory controller, the second command;
encoding the second command onto the protocol parameter and generating a message to carry the protocol parameter;
encrypting message; and transmitting the message via the wireless signal so that the wireless signal carrying the message is receivable by the luminaire;
wherein analyzing the wireless signal to identify the protocol parameter includes decrypting the message to identify the protocol parameter.

32. A method comprising
generating a set of commands for controlling a set of luminaires;
encoding the set of commands into a process control message including one or more protocol parameters selected from a preconfigured set of protocol parameters for a process control protocol that is configured to enable field devices in a process control environment to wirelessly communicate by way of command-response communications utilizing the preconfigured set of protocol parameters; wherein the one or more protocol parameters carry the set of commands; wherein the process control message is formatted according to the process control protocol;
encoding, according to one or more protocols from the Internet protocol suite, the process control message into an Internet protocol suite (IP) message so that the process control message is encapsulated in the IP message;
transmitting the IP message to a gateway configured to:
(i) receive the IP message;
(ii) decode the IP message, according to the one or more protocols from the Internet protocol suite, to identify the process control message;
(iii) decode the process control message, according to the process control protocol, to identify (a) the one or more protocol parameters carrying the set of commands; and (ii) corresponding device addresses for each of the one or more protocol parameters; and
(v) transmit the one or more protocol parameters to the corresponding device addresses so that the set of luminaires assigned the device addresses (a) receives the one or more protocol parameters, (b) decodes the one or more protocol parameters to identify the set of commands for controlling the set of luminaires, and (c) control the set of luminaires in accordance with the set of commands.

33. The method of claim 32, wherein generating the set of commands includes automatically generating the set of commands based on a control scheme implemented by a supervisory controller.

34. The method of claim 33, further including:
receiving, at the supervisory controller, one or more parameters set by the set of luminaires;
wherein automatically generating the set of commands includes automatically generating the set of commands based, at least in part, on the values of the one or more parameters set by the set of luminaires.

35. The method of claim 34, wherein the one or more parameters set by the set of luminaires includes a motion parameter.

36. The method of claim 34, wherein the one or more parameters set by the set of luminaires includes an ambient light parameter.

37. The method of claim 32, wherein the set of commands are manually set according to user input.

* * * * *